Feb. 20, 1923.

F. A. BALLOU, JR 1,445,817

NECK CHAIN FASTENER

Filed May 2, 1921

Inventor
Frederick A. Ballou Jr.

By  Howard E. Barlow
Attorney

Patented Feb. 20, 1923.

1,445,817

UNITED STATES PATENT OFFICE.

FREDERICK A. BALLOU, JR., OF PROVIDENCE, RHODE ISLAND, ASSIGNOR TO B. A. BALLOU & COMPANY INC., OF PROVIDENCE, RHODE ISLAND, A CORPORATION OF RHODE ISLAND.

NECK-CHAIN FASTENER.

Application filed May 2, 1921. Serial No. 465,954.

*To all whom it may concern:*

Be it known that I, FREDERICK A. BALLOU, Jr., a citizen of the United States, residing at Providence, in the county of Providence and State of Rhode Island, have invented certain new and useful Improvements in Neck-Chain Fasteners, of which the following is a specification.

This invention relates to necklaces and similar articles of jewelry but more particularly to articles of this character which are constructed of a series of beads strung together upon a chain, cord or other suitable flexible core; and the object of this invention is to provide the end beads of the string with means to receive and house the looped member to which the ends of the chain or cord are connected.

With these and other objects in view, the invention consists of certain novel features of construction, as will be more fully described, and particularly pointed out in the appended claims.

In the accompanying drawings:—

Figure 1:
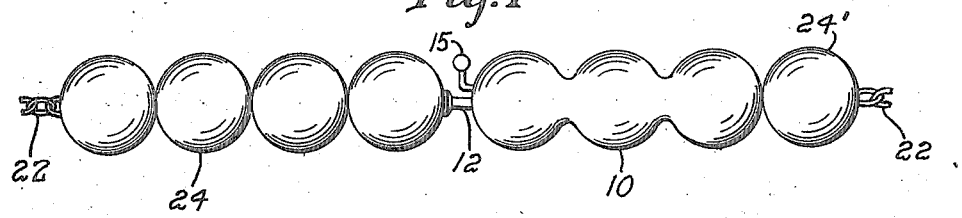
Figure 1 is a side elevation showing a series of beads strung upon a chain core.
Figure 2:
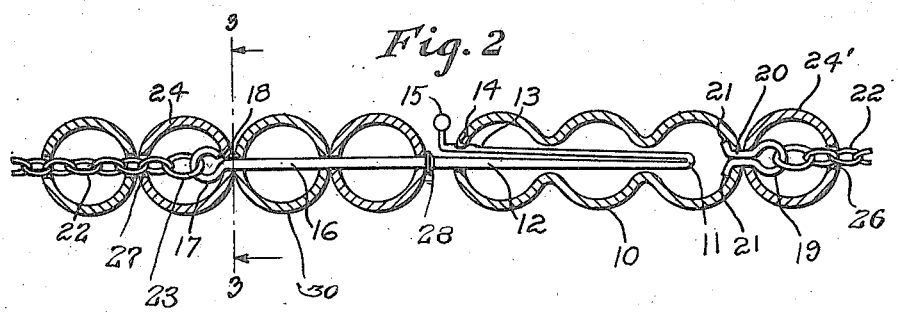
Figure 2 is an enlarged sectional elevation illustrating my improved means of attaching the end beads to the chain connecting loops to house the same.
Figures 3, 4:
Figure 3 is an end view of the shank portion of the male member of the catch sectioned on line 3—3 of Figure 2, showing the wire comprising the looped portion as being of less diameter than that of the shank portion thereof.
Figure 4 is a detailed view of the chain-attaching looped member which is connected to the end of the female portion of the catch.

With reference to the drawing, 10 designates the socket portion of my improved catch member which when used in connection with a string of beads preferably has its elongated body portion formed so as to present the appearance of beads, a number of which may be constructed to provide the necessary socket for the end 11 of the snap or male portion of the catch. This snap 12 is shown as being provided with a return bend portion notched at 13 to receive the edge 14 of the socket member, the outer end 15 of this snap being adapted to be depressed to release it from its socket member. The shank portion 16 of this snap may also extend through one or more beads, if desired and the diameter of the wire at the end of this shank portion is preferably reduced slightly and this reduced portion bent into loop form as at 17. One side of this loop may be left open as at 18, if desired, to receive the end ring 23 of the chain 22 on which the beads are strung.

The socket member 10 of the catch is preferably provided with a loop member 19 formed in the shape of an eye having a shank portion 20 extending through into the end of the socket member, the ends 21 of said shank being spread to lock or anchor this loop in the socket whereby the opposite end of the chain 22 may be attached thereto.

Figure 5:
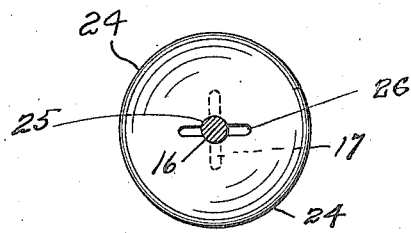
Figure 5 is a view of one of the hollow balls or beads, showing the same as slotted to receive the loop at the end of the catch member, and the shank of the catch as sectioned on line 3—3 of Figure 2.

It is found in practice to be of advantage to cover or house these loops 17 and 19 by the beads adjacent thereto. Therefore I have constructed each of these end beads 24 24' hollow and each is provided with a central hole 27 through which the chain 22 passes and in addition to this hole 27 I have slotted the wall of bead 24 at 26, which is adjacent the loop, as illustrated in Figure 5, which slot is of a size just a little smaller than that of the loop requiring some pressure to force the loop therethrough and this bead after receiving the loop is adapted to be rotated one-quarter turn so as to bring the loop out of register with the slot thereby locking the bead to the loop.

In order to cause this bead 24 to remain in its locked position relative to the loop 17, a space is left on the shank 16 between the loop and the collar 28 just sufficient to permit the adjacent wall of the bead 24 to enter between the adjacent wall of the bead 29 and the back of the loop 17, so that it is necessary to bring sufficient pressure to bear upon the housing bead 24 to either compress it slightly or to compress the adjacent abutting walls of the loop of the catch member, in order to permit the housing bead 24 to be rotated into locked position and this pressure between the bead and the end wall of the catch members serves to bind the housing bead in locked position. In other words the first bead of the chain on either or both sides of the catch member, is provided with what might constitute a so-called bayonet joint whereby it may be slipped over the loop on the end of the catch and be rotated and locked in position thereon.

By my improved construction of securing the end bead over the loop of the snap or catch member it performs two functions; first, it covers the loop to which the end of the chain is fastened; and second, it provides means whereby the bead may be unlocked by turning backward one-quarter of a revolution to be slid back from the loop permitting the chain to be disengaged therefrom for inspection and repairs or for lengthening the chain, when desired.

Then again by this construction as no solder is required for connecting the parts, the necessity of heating the hardened snap and so drawing its temper, is obviated.

I have shown a core formed of a chain but a cord or any other suitable flexible material may be employed on which to string beads and in any case the end bead of the string may be employed as a housing or cover for the more or less unsightly means of connecting the ends of a flexible core to a catch.

The device is extremely simple and practical in construction and effective in its operation.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. An article of the character described comprising a flexible core having a connector member for joining its ends, said member having a shank portion with an attaching loop at one end, a hollow ball on said core having means for receiving and housing and being locked to said loop, said connector shank having a resilient arm at its opposite end and folded back upon itself, and a socket member for housing said folded portion having means to engage a notch in said arm to releasably retain the same when inserted thereinto.

2. An article of the character described comprising a flexible core having a connector member for joining its ends, said member having a shank portion with an attaching loop at one end, a hollow ball on said core slotted to receive said loop and adapted to be rotated to lock the loop therein, said connector shank having a resilient arm at its end folded back upon itself, and a socket member for housing said folded portion having means to engage a notch in said arm to releasably retain the same when inserted thereinto.

3. An article of the character described comprising a flexible connecting core on which is strung a series of beads, a separable connector member for the ends of the chain having a loop at one end to which the end of the core is attached and one of said beads on the core being hollow and slotted to receive said loop and adapted to receive a relative rotation to lock it to said loop, the opposite end of said connector having a spring snap catch and a housing for said catch connected to the opposite end of the chain for receiving and releasably engaging said catch.

4. An article of the character described comprising a chain having a separable connector member for releasably joining its ends, said member being provided with a shank having a chain-attaching loop at one end, a hollow ball on said chain being slotted to receive said loop and adapted to be rotated on said shank to move said slot out of registration with said loop, the walls of said ball being adapted to bind between the shoulders of the loop and the adjacent portion of a connector member to frictionally hold the ball in locked position, the opposite end of said shank being provided with a spring snap, and a housing member for engaging said snap and connected to the opposite end of the chain.

In testimony whereof I affix my signature.

FREDERICK A. BALLOU, Jr.